United States Patent
Von Fellenberg (10) Patent No.: US 10,465,647 B2
(45) Date of Patent: Nov. 5, 2019

(54) FRANCIS TURBINE WITH SHORT BLADE AND SHORT BAND

(71) Applicant: Andritz Hydro Ltd., Point Claire (CA)

(72) Inventor: Sven Von Fellenberg, Montreal (CA)

(73) Assignee: Andritz Hydro Ltd., Point Claire (CA)

( * ) Notice: Subject to any disclaimer, the term of this patent is extended or adjusted under 35 U.S.C. 154(b) by 356 days.

(21) Appl. No.: 15/328,424

(22) PCT Filed: Apr. 30, 2015

(86) PCT No.: PCT/CA2015/050367
§ 371 (c)(1),
(2) Date: Jan. 23, 2017

(87) PCT Pub. No.: WO2016/011537
PCT Pub. Date: Jan. 28, 2016

(65) Prior Publication Data
US 2017/0211539 A1    Jul. 27, 2017

Related U.S. Application Data

(60) Provisional application No. 62/027,910, filed on Jul. 23, 2014.

(51) Int. Cl.
*F03B 3/12*    (2006.01)
*F03B 3/02*    (2006.01)
*F03B 3/18*    (2006.01)

(52) U.S. Cl.
CPC ............... *F03B 3/125* (2013.01); *F03B 3/02* (2013.01); *F03B 3/121* (2013.01); *F03B 3/186* (2013.01);
(Continued)

(58) Field of Classification Search
CPC ........ F03B 3/02; F03B 3/125; F05B 2220/32; F05B 2220/64; F05B 2240/24; Y02E 10/226
(Continued)

(56) References Cited

U.S. PATENT DOCUMENTS

| 2,622 | A | * | 5/1842 | Woodard | .................. | F03B 3/02 |
| | | | | | | 415/205 |
| 20,456 | A | * | 6/1858 | Tyler | ......................... | F03B 3/02 |
| | | | | | | 415/151 |

(Continued)

FOREIGN PATENT DOCUMENTS

| CA | 2851384 | 5/2013 |
| CN | 103485958 | 1/2014 |

(Continued)

OTHER PUBLICATIONS

Bruce M. Brown, International Search Report, dated Jul. 22, 2015, pp. 2-5, Canadian Intellectual Property Office, Gatineau, Quebec, Canada.

(Continued)

*Primary Examiner* — Justin D Seabe
*Assistant Examiner* — Brian Christopher Delrue
(74) *Attorney, Agent, or Firm* — Robert Joseph Hornung (57) ABSTRACT

A Francis turbine runner including a shortened band length and a shortened blade length combined with a reversed runner blade leading edge having a junction of the leading edge with the band forerunning a junction of the leading edge with the crown in the rotational direction, and a bandless runner including a shortened periphery length and a shortened blade length combined with a reversed runner blade leading edge having a corner of the leading edge at the outer periphery of the runner that is in advance of where the leading edge joins the crown in the rotational direction.

(Continued)

Additional feature includes an inverted trailing edge curvature design on the runner blade that further shortens the blade length.

16 Claims, 13 Drawing Sheets

(52) U.S. Cl.
CPC ..... *F05B 2220/32* (2013.01); *F05B 2240/242* (2013.01); *Y02E 10/223* (2013.01)

(58) Field of Classification Search
USPC .......................................................... 415/116
See application file for complete search history.

(56) References Cited

U.S. PATENT DOCUMENTS

| | | | | |
|---|---|---|---|---|
| 31,961 A * | 4/1861 | Dripps | ...................... | F03B 3/02 415/205 |
| 39,783 A * | 9/1863 | Symonds | .................. | F03B 3/02 415/205 |
| 117,193 A * | 7/1871 | Mooney | .................... | F03B 3/02 415/129 |
| 146,068 A * | 12/1873 | Hamilton | .................. | F03B 3/02 416/187 |
| 1,509,653 A * | 9/1924 | Kaplan | .................... | F03B 3/125 415/218.1 |
| 1,514,293 A * | 11/1924 | Lawaczeck | ............. | F03B 3/125 415/218.1 |
| 1,529,456 A * | 3/1925 | White | ...................... | F03B 3/125 415/144 |
| 1,942,995 A * | 1/1934 | Biggs | ........................ | F03B 3/125 415/115 |
| 2,772,863 A * | 12/1956 | Harney | ................... | F04D 3/005 261/93 |
| 3,797,965 A * | 3/1974 | Tonooka | ................ | F03B 3/121 416/186 R |
| 3,918,627 A * | 11/1975 | Kawano | .................. | F03B 3/121 228/178 |
| 4,479,757 A | 10/1984 | Holmes | | |
| 4,780,051 A * | 10/1988 | Fisher, Jr. | ............. | C02F 3/1294 261/87 |
| 5,879,130 A * | 3/1999 | Beyer | ..................... | F03B 3/125 415/115 |
| 5,896,657 A * | 4/1999 | Beyer | ..................... | F03B 3/125 29/889.6 |
| 6,135,716 A * | 10/2000 | Billdal | .................... | F03B 3/125 416/183 |
| 6,155,783 A * | 12/2000 | Beyer | ....................... | F03B 3/02 29/469.5 |
| 6,524,063 B1 * | 2/2003 | Beyer | ..................... | F01D 5/147 415/115 |
| 7,128,534 B2 | 10/2006 | Enomoto et al. | | |
| 7,195,459 B2 | 3/2007 | Enomoto et al. | | |
| 7,195,460 B2 * | 3/2007 | Bazin | ...................... | F03B 3/125 416/223 A |
| 7,198,470 B2 | 4/2007 | Enomoto et al. | | |
| 8,506,244 B2 * | 8/2013 | McBride | .................. | F03B 3/02 415/204 |
| 9,175,662 B2 * | 11/2015 | Bouvet | .................... | F03B 3/125 |
| 9,605,647 B2 * | 3/2017 | Marier | ...................... | F03B 3/02 |
| 2004/0255917 A1 * | 12/2004 | Mokry | ................... | F02B 33/40 123/559.1 |
| 2006/0115357 A1 * | 6/2006 | Coulson | ................. | F03B 3/125 415/203 |
| 2012/0076648 A1 * | 3/2012 | McBride | .................. | F03B 3/02 415/204 |
| 2015/0192101 A1 * | 7/2015 | Rossi | ..................... | F03B 3/125 416/186 R |
| 2015/0285207 A1 * | 10/2015 | De Colombel | .......... | F03B 3/02 416/183 |
| 2016/0076508 A1 * | 3/2016 | Bornard | .................. | F03B 3/02 416/131 |
| 2016/0084216 A1 * | 3/2016 | Bornard | .................. | F03B 3/02 60/325 |

FOREIGN PATENT DOCUMENTS

| | | | |
|---|---|---|---|
| EP | 1662136 | 5/2006 | |
| EP | 1662136 A2 * | 5/2006 | ............. F03B 3/125 |
| JP | 2007064018 | 3/2007 | |

OTHER PUBLICATIONS

Columbian Patent Office Action for Columbian Patent Application No. NC2017/0001180, dated Jun. 2018, Columbia.
Chilean Patent Office Office Action, Chilean Patent Application No. 126-2017, Jun. 20, 2018, Chile.
Australian Patent Office Examination report, Australian Patent Application No. 2015292214, dated Jun. 21, 2018, Australia.
Chinese Office Action, dated Aug. 28, 2018, pp. 1-11, China.
Japanese Patent Office Action for Japan Patent Application No. 2017-503085, dated 2019, Japan.

* cited by examiner

FRANCIS TURBINE WITH SHORT BLADE AND SHORT BAND

CROSS REFERENCE TO RELATED PATENT APPLICATIONS

This application is related to and claims the benefit of PCT International Patent Application Number PCT/CA2015/050367, filed on Apr. 30, 2015, which in turn claims the benefit of U.S. Provisional Patent Application No. 62/027,910, filed on Jul. 23, 2014. Each of the above-identified priority patent applications is incorporated herein by reference in its entirety.

TECHNICAL FIELD

The present invention relates to hydraulic turbines, such as Francis turbines. The invention particularly relates to the blades and band of a runner of a Francis turbine.

BACKGROUND OF THE DISCLOSURE

Figure 1:
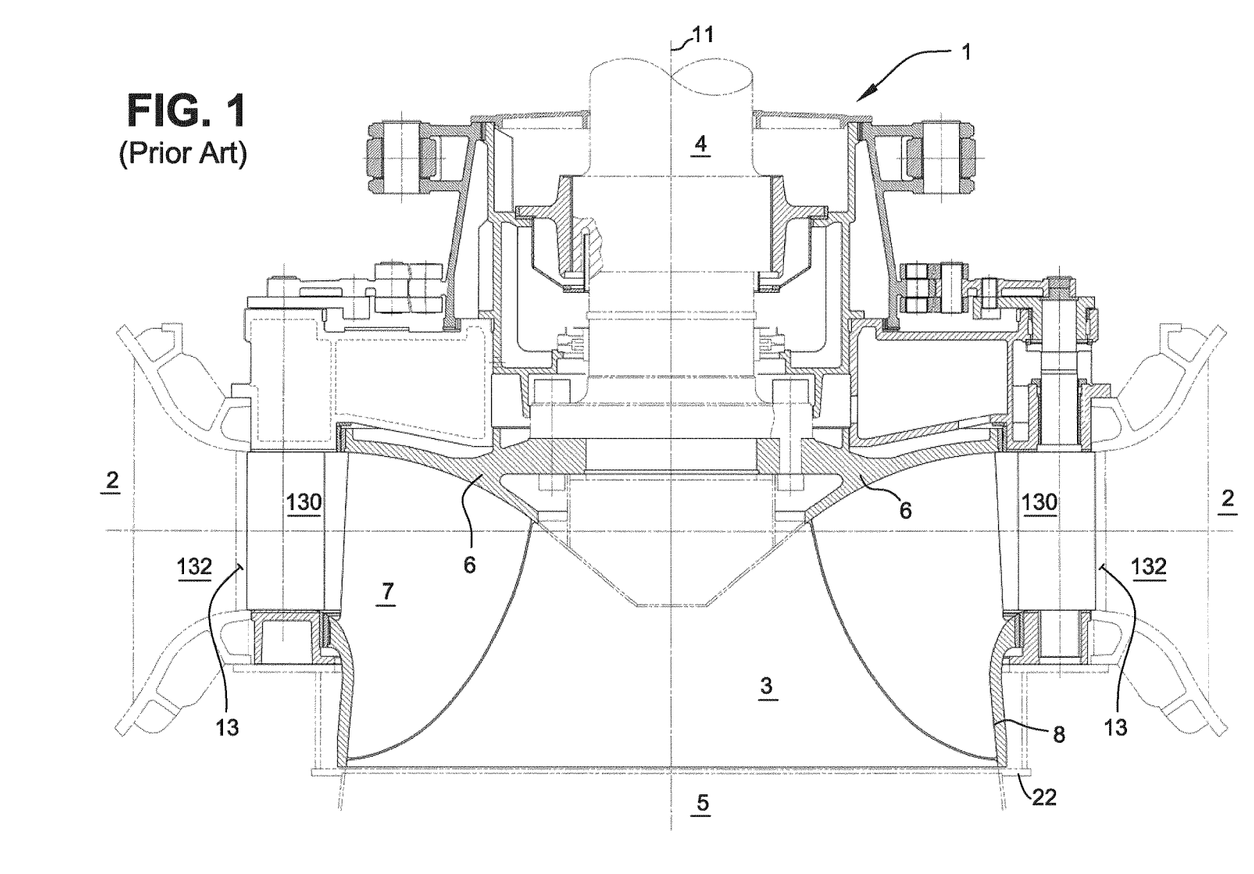
FIG. 1 is a side view, shown in partial cross section, of a conventional vertical Francis turbine having a distributor with stay vanes and guide vanes, a runner, a draft tube and a spiral casing.

FIG. 1 shows a conventional Francis hydraulic turbine 1 configured to convert hydraulic energy to torque to drive an electrical generator (not shown). Water typically flows through a spiral casing 2 into a distributor 13 surrounding a rotating runner 3 of the turbine 1. The distributor 13 may have stay vanes 132 and guide vanes 130. Water flows inward into the runner in a generally spiraling motion along a horizontal direction inside a turbine having a vertical axis. The rotational velocity of the water drives the runner to turn around the axis. As the water flows through the runner, the transport component of the water is turned from a horizontal flow to a generally vertical outflow. From the runner, water flows into a vertical cone of the draft tube 5 below the runner.

In the case of a turbine having a horizontal axis, the water flows inward into the runner in a generally spiraling motion. The rotational velocity of the water drives the runner to turn around the axis. As the water flows through the runner, the water is turned to a generally horizontal outflow. From the runner, water flows into a horizontal cone of the draft tube downstream from the runner.

The runner 3 of a Francis turbine typically includes a crown 6 having a surface of revolution extending towards the band 8 along an axis 11 of the runner 3, and blades 7 extending out from the surface of revolution of the crown 6 to an annular band 8. Each blade 7 has a leading edge and a trailing edge. The ends of these edges are joined to the crown 6 and the band 8. The runner 3 may be located above a bottom ring 22 in the turbine.

Water enters the runner 3, flows around the leading edges of the blades, flows between the blades, and passes over the trailing edges of the blades, then flows into the draft tube 5.

The velocity of the water is generally faster near the band than near the crown in the runner. The high velocity water flow results in relatively high hydraulic friction at and near the band which reduces the efficiency of the turbine, as part of the energy is lost to friction. The high velocity water also causes low static pressure in the runner. The low pressure can cause the formation of cavitation bubbles that can damage the surfaces of the blades, the band, and the crown.

In the field of water turbines, the runner band is also known as a shroud or ring. The crown is also known as a hub. The leading edge of a blade is also known as an inlet edge or an inflow edge. The trailing edge of a blade is also known as an outlet edge or an outflow edge of a runner blade. This disclosure may use the terms interchangeably in reference to the different runner components.

Figure 2:
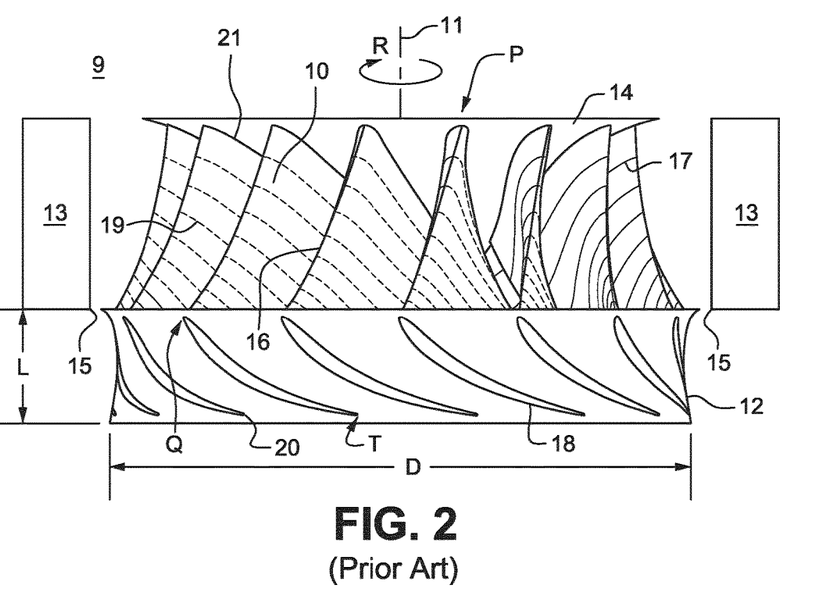
FIG. 2 is a side view of a schematic illustration of a conventional runner for a Francis turbine.
Figure 3:
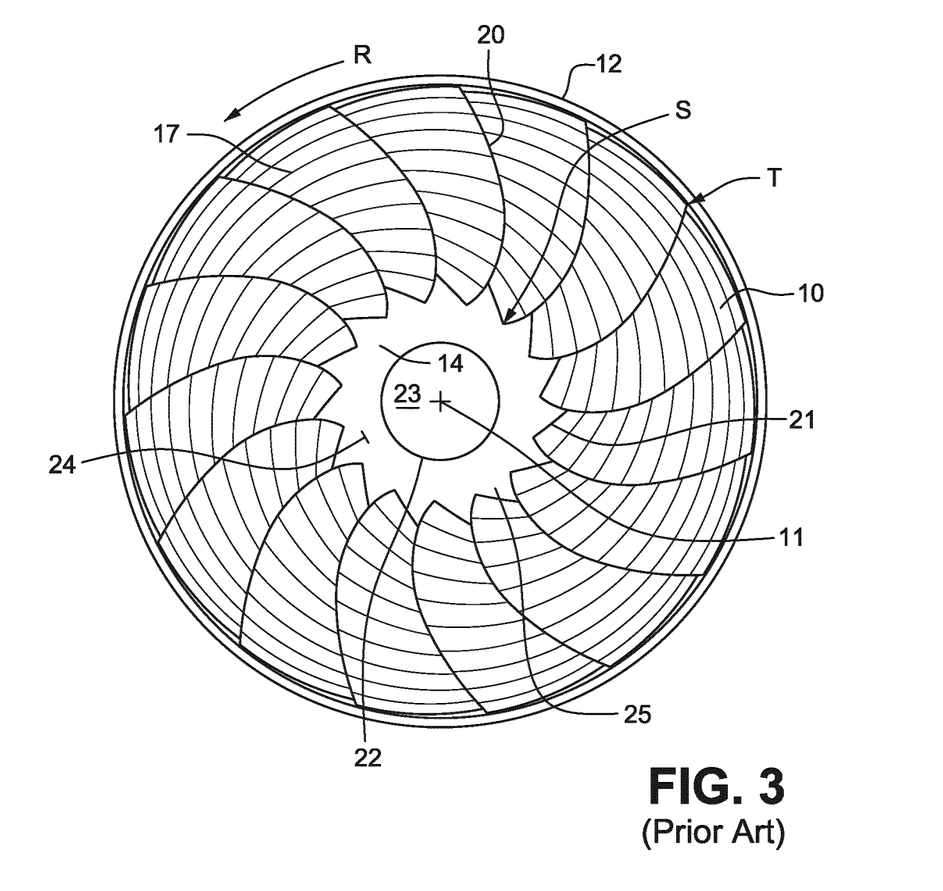
FIG. 3 is a bottom view of the conventional runner.

FIGS. 2 and 3 are side and bottom views, respectively, of an exemplary conventional Francis turbine runner 9 that rotates in direction (R) around a rotational axis 11 of the runner 9. The runner 9 includes an annular array of runner blades 10, an annular band 12, and a crown 14. The runner 9 rotates clockwise when viewed from the crown 14. The crown 14 has a surface of revolution that typically faces the band 12 along the rotational axis 11. An opening 23 in the crown 14 is coaxial with the axis 11, and may receive a shaft for a generator.

FIG. 2 shows the ends 18 of the blades 10 superimposed on the band 12 for purposes of illustration. The ends of the blades 10 are joined, e.g., welded, to the band 12, but need not extend through the band 12. The ends 18 of the blades 10 may not be visible through the band 12 in a practical embodiment of the runner 9.

The blades 10 are arranged in an annular array between the band 12 and crown 14 of the runner 9. The blades 10 direct water from the spiral casing 2 to flow between the band and the crown and into the draft tube 5 as shown in FIG. 1.

Each blade 10 has a similar shape extending as a curve from the leading edge 16 to the trailing edge 20. The leading edge 16 is at the inlet to the runner 9 and the trailing edge 20 is at the outlet. Pseudo-streamlines 17, 19 are drawn on the image of the blades 10 to illustrate the shape of the blades 10. Solid pseudo-streamlines 17 are shown on the suction side of the blades 10, and dashed pseudo-streamlines 19 are shown on the pressure side of the blades 10. The suction sides of the blades 10 face towards the rotation (R) direction of the runner, and the pressure sides face away from the rotation (R) direction. Each pseudo-streamline 17, 19 is drawn on the surface of the blade 10 from the leading edge 16 to a trailing edge 20.

Each blade 10 has four corners P, Q, S and T. Two corners P and S of blade end 21 abut the crown 14 and two corners Q and T abut the band 12. The corners P, S abut the outer surface of the crown 14. The corner P is near the upstream region of the crown 14 and the corner S is at the downstream region 25 of the crown 14. The corners Q and T of the blade end 18 abut the band 12, with corner Q being located close to a first rim of the band 12 and corner T being near a second rim of the band 12.

The outer surface of the crown 14 supports the ends 21 of the blades 10. The ends 21 may be joined to the crown such as by welding. The crown 14 may have an internal opening to receive a drive shaft. A portion 24 of the outer surface of the crown 14 extends beyond the corners S of the blades 10 in streamwise direction. The portion 24 of the crown 14 faces the draft tube 5.

The band 12 is an annular structure supporting the ends 18 of the blades 10. The band 12 may have a curvature that curves towards the axis 11 of the turbine runner 3. The curvature conforms to the edges 18 of the blades 10. The band has a length (L) and a diameter (D). Length (L) is a distance measured between the bottom 15 of the distributor 13 to the trailing edge T at the band 8. Diameter (D) is an outlet diameter of the runner 3, which is a diameter of the band 12 at the junction with the trailing edge T. A normalized band length, called a "band length ratio" in the context of this disclosure, may be characterized by the ratio of its length to its minimum diameter (L/D).

Conventional runners have a band length ratio of at least 17% (0.17). These are referred to as long runners in the context of this application.

In the context of this application, runners referred to as short runners have a band length ratio of less than 17% (0.17). Short runners have been tried in the past, but suffered from severe cavitation damages which damaged the runner and reduced its hydraulic efficiency. Cavitation is usually less excessive in long band runners with long blades. Conventional wisdom is that bands and blades should be long to avoid cavitation.

The increased length of the blades and the band in a long runner increases the mass of the runner. The hydraulic efficiency of the long runner suffers because of the increase in hydraulic frictional losses due to the increased wetted surface areas of the longer blades and band. Efforts to reduce cavitation in a runner and otherwise improve runner performance are disclosed in U.S. Pat. Nos. 6,135,716 and 4,479,757. There remains a need to improve runner performance and reduce cavitation in a runner.

SUMMARY OF THE DISCLOSURE

A short runner has been conceived having short blades with forerunning leading edges. The short runner has less wetted surface area as compared to a long runner, which results in reduced hydraulic friction and improved performance. The short runner may have a band or can be bandless (shroudless).

In a forerunning leading edge, the leading edge joins the band in advance of where the leading edge joins the crown in the direction of rotation of the runner. A forerunning leading edge may also be referred to as a reversed leading edge.

A forerunning leading edge shifts the pressure loading of a blade towards the crown and away from the band. Loading refers to the hydraulic force applied to the various positions on the surface a blade as a result of the pressure difference between pressure and suction side. Due to the shift in loading, the blades are more uniformly loaded between the band and crown.

Shifting the loading of the blade away from the band reduces the cavitation risk at the band and at the blade surfaces near the band. By reducing the cavitation risk, a short blade becomes practical. Other blade parameters, such as blade thickness and distribution of the blade angles, may be selected to reduce the cavitation risk and risk of damage to the runner due to cavitation.

The combination of short blades having forerunning leading edges results in a short runner with reduced hydraulic friction as compared to a conventional long runner. The cavitation risk in the short runner is within acceptable levels. The short runner has less weight than a conventional long runner which results in lower costs of materials and production cost to manufacture the runner.

The trailing edges of a short blade may be inverted. An inverted trailing edge has a curvature that curves towards the leading edge of the blade. The curvature extends along the entire length of the trailing edge from the band to the crown of a runner. An inverted trailing edge reduces the length of the blade along the pseudo-streamlines 17, 19, especially at the mid-span regions of the blade. Shortening the length of the blades reduces the wetted surface area of the blades and thus reduces hydraulic friction.

The short runner may be used to replace an existing runner, especially where there is little available space in an existing hydraulic turbine within which to insert the runner. The short runner also allows for new turbine assembly designs to have a reduced size and lower costs of material and production than the sizes and costs to produce a conventional turbine.

A short runner may include a band, a crown, an array of short blades having forerunning leading edges, and a band length ratio of less than 17% (0.17). Further, the trailing edges of the blades may be inverted, i.e., are curved towards the leading edge between the crown and the band.

A bandless (shroudless) turbine runner may include a crown, an array of short blades having forerunning leading edges, and an outer periphery of the runner having a periphery length ratio of less than 17% (0.17). In addition, the trailing edges of the blades may also be inverted.

DETAILED DESCRIPTION OF THE DRAWINGS

Figure 4:
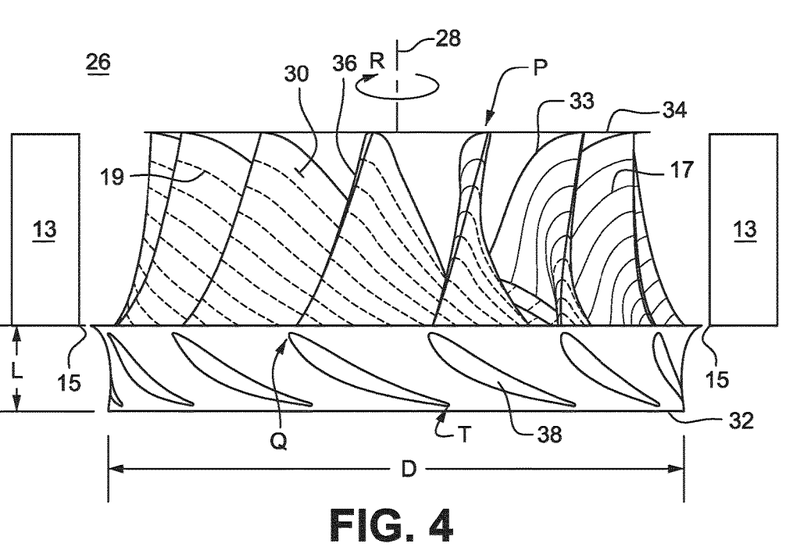
FIG. 4 is a side view of a schematic illustration of a short runner having a short band and short blades.
Figure 5:
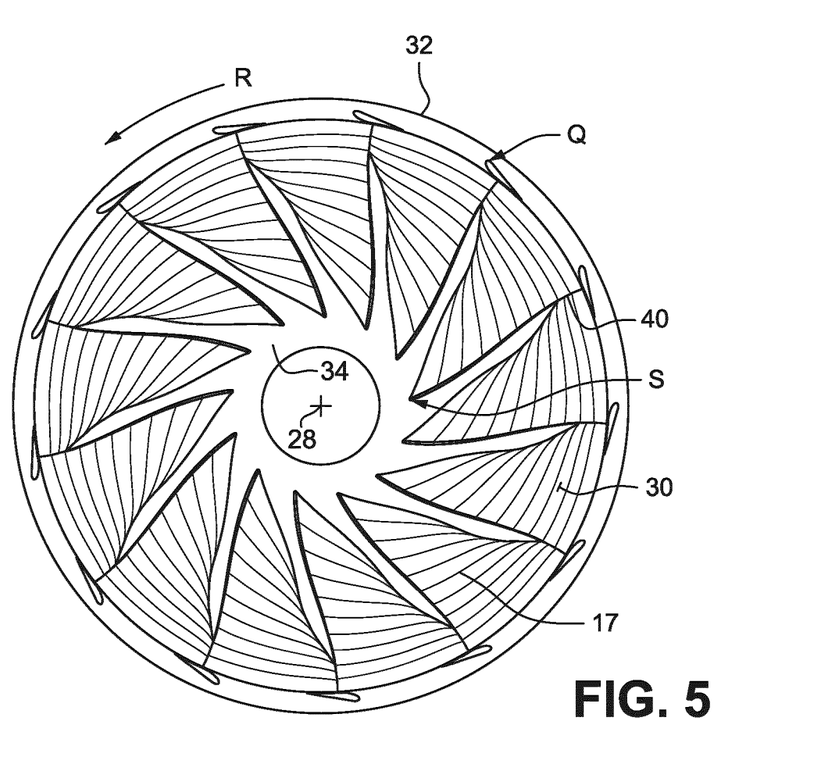
FIG. 5 is bottom view of the short runner shown in FIG. 4.

FIGS. 4 and 5 illustrate a short runner 26 for a Francis turbine with blades 30 having a forerunning leading edge. The short runner 26 rotates in direction (R) about an axis 28. The band length ratio (L/D) is less than 17% (0.17) and may be less than 15% (0.15) and in a range of 11% to 7% (0.11 to 0.07).

The short runner 26 includes an annular array of runner blades 30, an annular band 32 and a crown 34. Direction (R) is in a clockwise direction when the runner is viewed from the crown 34. The crown 34 may have a surface of revolution extending towards the band 32 along the axis 28 of the runner 26. Each blade 30 includes a leading edge 36 and a trailing edge 40.

The leading edges 36 are at the upstream inlet to the runner 26 and are downstream from the spiral casing and the distributor for water or other hydraulic fluid. The trailing edges 40 are at the downstream end of the runner and face a draft tube that may be downstream of the runner 26. Solid pseudo-streamlines 17 are shown on the suction side of the blade illustration, and dashed pseudo-streamlines 19 are shown on the pressure side of the blade illustration. The pseudo-streamlines 17, 19 are for purposes of illustration, and do not indicate structure on the surfaces of the blades, nor represent actual streamlines.

A first edge 33 of each blade 30 is fixed to the outer surface of the crown 34 and a second edge 38 is fixed to an inner surface of the band 32. The corners P, S of first edge 33 are at the upstream region and downstream region, respectively, of the outer surface of the crown. The corners Q, T are at the upstream and downstream regions of the band 32, respectively.

The band length L is short compared to conventional bands. To accommodate the shorter band length L, the blade length has been shortened along edge 38. A comparison of FIGS. 2 and 4 shows that the band length L and the length of the edge 38 of the blades 30 of the short runner 26 are shorter than the blades 10 of the long runner 9.

The curvature of the blade 30, as depicted through the dashed pseudo-streamlines 19 and solid pseudo-streamlines 17, has proportions to accommodate a short edge 38 and a short band 32.

Figure 6:
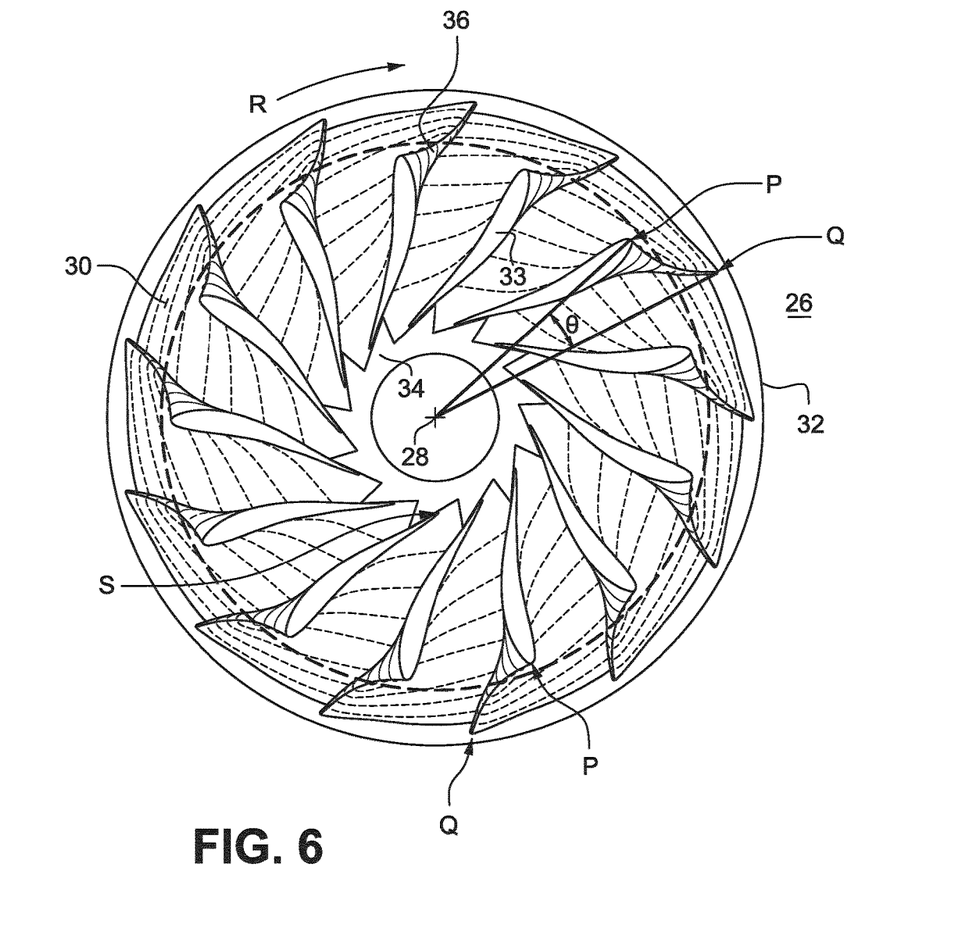
FIG. 6 is a top view of the runner shown in FIG. 4 wherein the crown is shown in dashed lines for purposes of illustrating the blades.

FIG. 6 illustrates the forerunning leading edge 36 of each blade 30. In a forerunning leading edge 36, the corner Q of the edge at the band 32 is angularly in front of the corner P at the crown 34, in the direction of rotation R of the runner. A rake angle ($\Theta$) is the angle between the corners Q and P of the leading edge 36 of the blade 30 that is measured from the axis 28 of the short runner 26 towards the corners Q and P. A positive rake angle exists when the P corner is ahead of the Q corner in the rotation direction R. A negative rake angle ($\Theta<0°$), such as shown in FIG. 6, indicates a forerunning leading edge.

A forerunning leading edge junction Q shifts the hydraulic loading of the blade away from the band 32 and towards the crown 34. This shift reduces the hydraulic load near the band 32 and thereby reduces the cavitation risk at the band 32 and the portions of the blades 30 near the band 34. The shift of the hydraulic load towards the crown 34 also provides a more uniform loading along the span of the blade 30.

Figure 7:
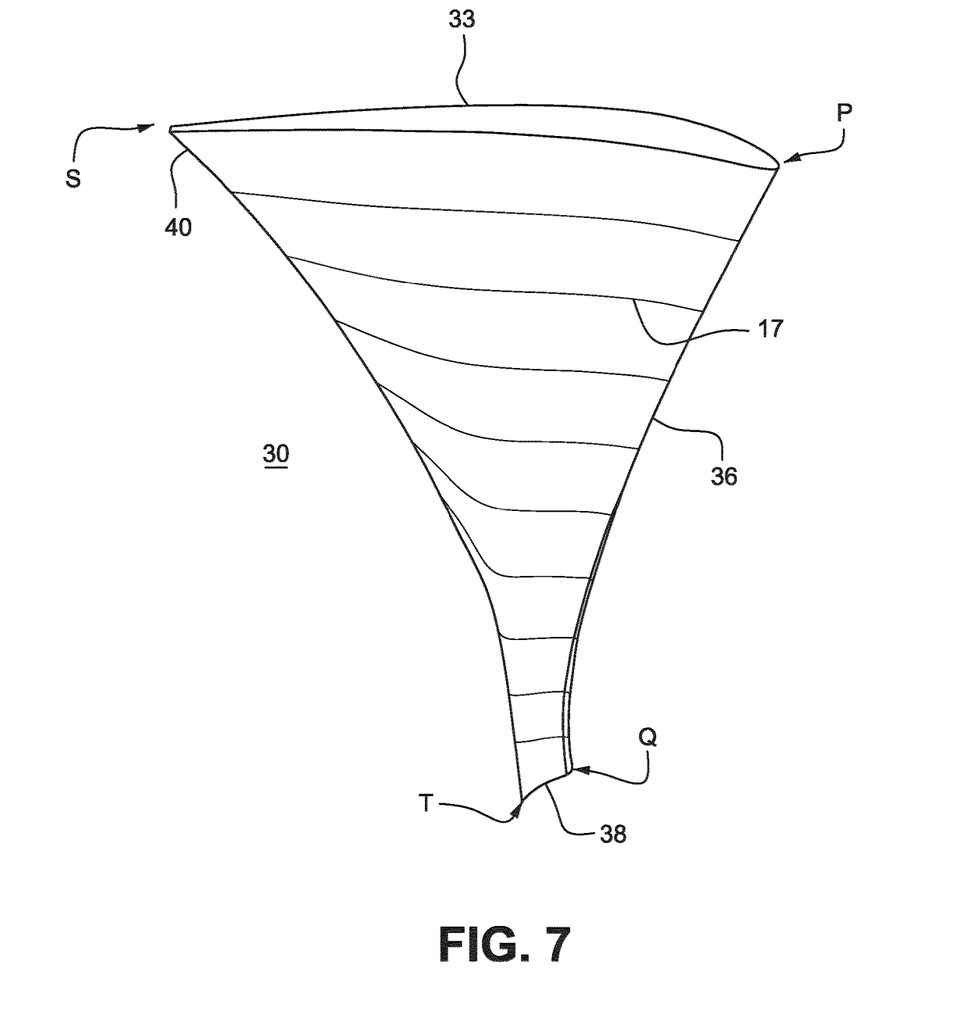
FIG. 7 is a perspective view of a short runner blade showing the leading edge, wherein pseudo-streamlines are drawn on the surface of the blade.
Figure 8:
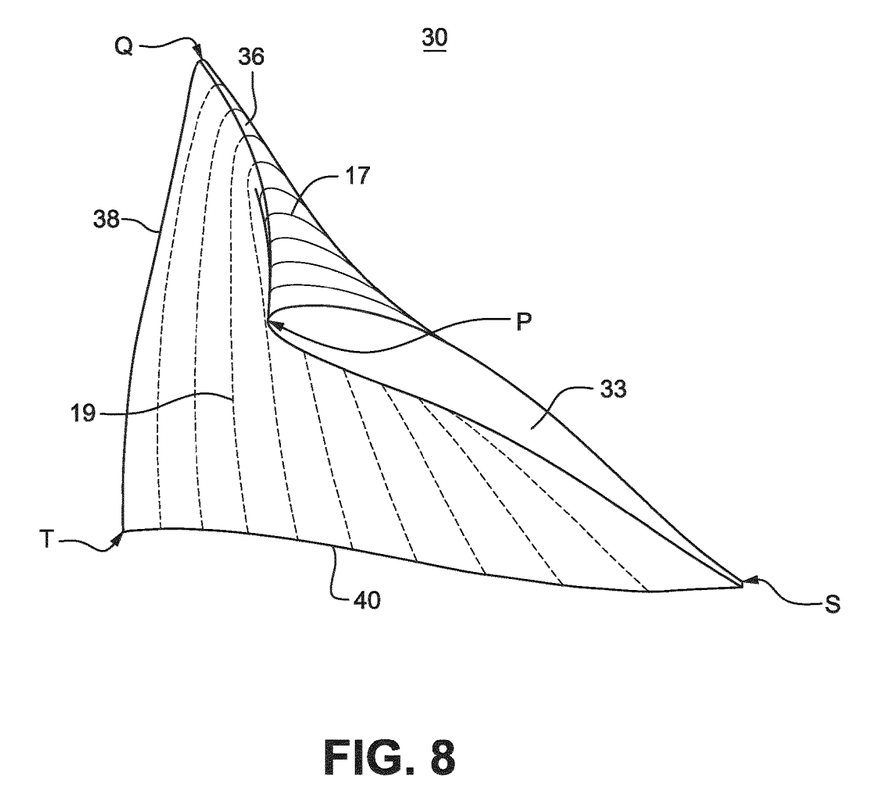
FIG. 8 is a perspective view of the runner blade shown in FIG. 7, and provides a top down view of the blade.
Figure 9:
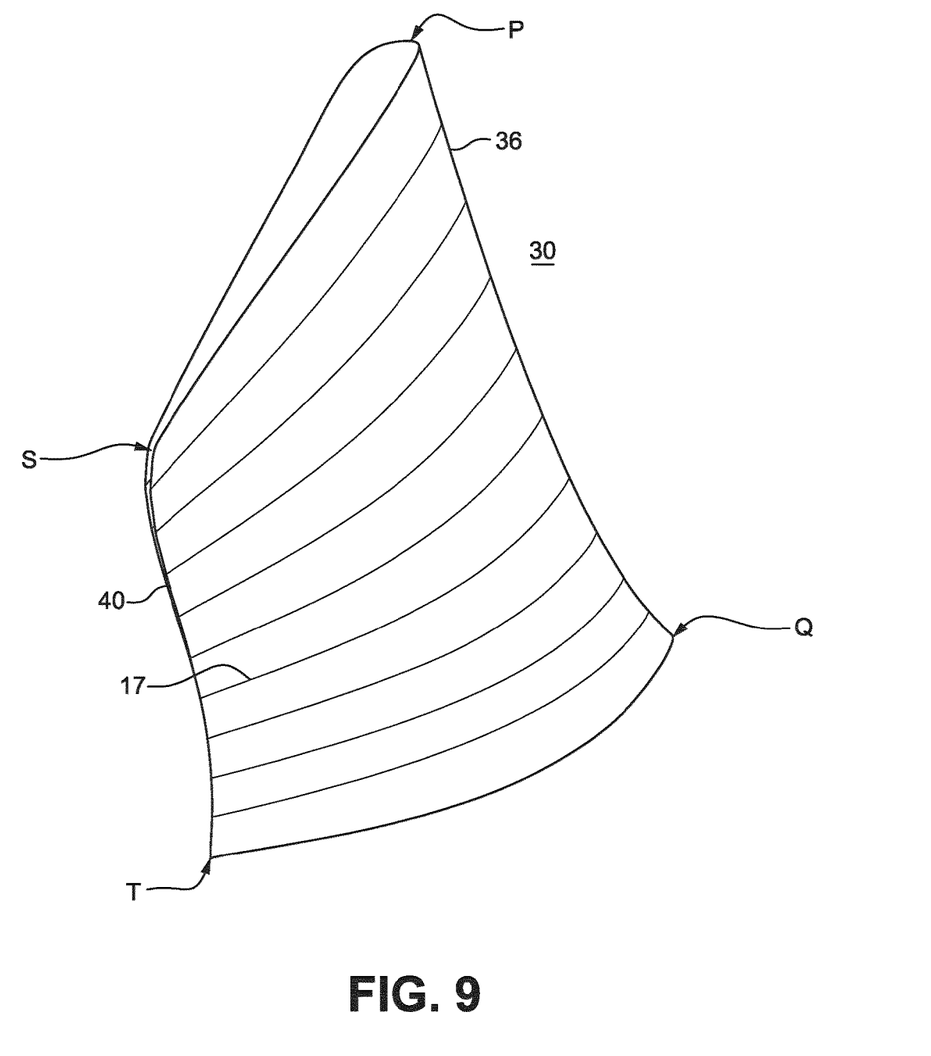
FIG. 9 is a perspective view of the runner blade shown in FIG. 7, and provides a view of the trailing edge.

FIGS. 7, 8 and 9 are views of a blade 30 in the short runner 26 from different viewpoints. The blade 30 can be seen to be "V" shaped in the view shown in FIG. 7, seen at an angle looking towards the suction side of the blade 30. The edge 33 of the blade 30 attaches to the crown and the edge 38 attaches to the band. The corners P, Q, S and T of the blade correspond to the corners shown in FIGS. 4, 5 and 6.

Figure 10:
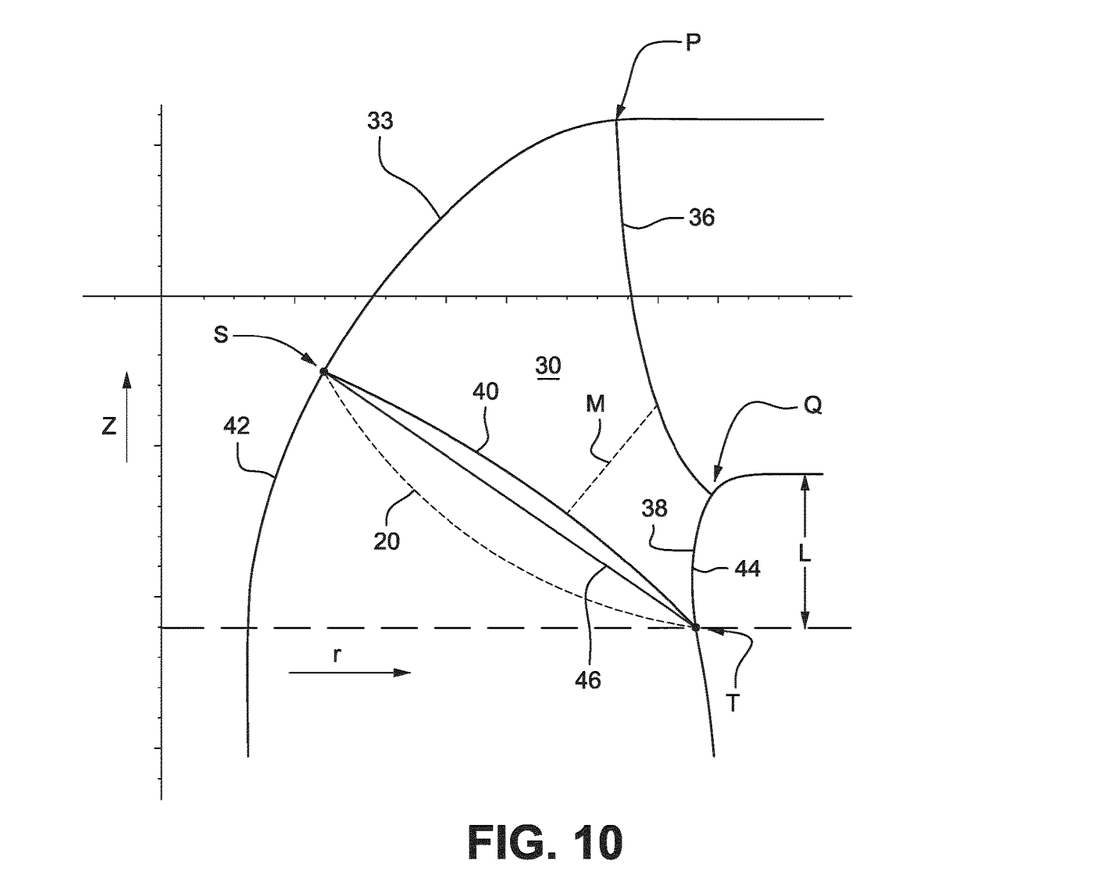
FIG. 10 is a meridional view of a short runner blade.

FIG. 10 is a meridional view of a short runner to illustrate the leading edge 36 and the trailing edge 40 of the blade 30, shown in FIGS. 7 to 9. The edge 33 of the blade 30 is shown abutting a profile line 42 representing the outer surface of the crown 34. The opposite edge 38 of the blade 30 abuts a profile line 44 of the inner surface of the band. The vertical axis (Z) of the chart represents the rotation axis and the horizontal radius (r) represents the distance from the axis 28 of the runner to the junction of the trailing edge with the band (point T).

An inversion of the trailing edge 40 on the short blade 30 is evident from the curvature of the trailing edge 40 as compared to a straight line 46 between the corners of S and T of the trailing edge. The trailing edge 40 has a shape that is curved towards the leading edge 36 of the blade 30. In contrast to the inverted trailing edge, a conventional trailing edge 20 (shown in dashed lines in FIG. 10) curves away from the leading edge 36 and thus bows outwardly away from the straight line 46.

The inverted trailing edge 40 shortens the length of the blade 30, particularly at the mid-span (M) region of the blade. Shortening the blade 30 reduces the wetted surface area of the blade 30, and thus reduces the hydraulic friction between the blades 30 and the water. Reduced friction increases the efficiency of the Francis turbine in converting energy in the water to torque applied to the shaft.

The total wetted surface area of the short runner may be reduced as compared to the wetted surface area of a conventional long runner by fifteen percent (15%) or more. The reduction in the wetted surface area of the short runner is due to the shorter band and shorter blades as compared to a conventional long runner. The reduction in wetted surface area become even greater, e.g., more than twenty percent (20%), by inverting the trailing edges of the blades on the short runner.

Hydraulic surface friction may be quantified by measuring shear stress on the wetted surfaces of a runner. Shear stress on the surfaces is a result of the friction between the water flowing over the wetted surfaces of the runner, and the runner surface. Reducing the surface area reduces the area on which shear stress is produced by the water to create hydraulic friction. The reduced wetted surface area of a short runner can reduce hydraulic shear stress integrated over the surface by thirty percent (30%) or more as compared to a long runner. By reducing the amount of hydraulic shear stress, the energy losses due to friction are reduced and thus more energy may be converted into torque to drive the shaft of the runner.

Figure 11:
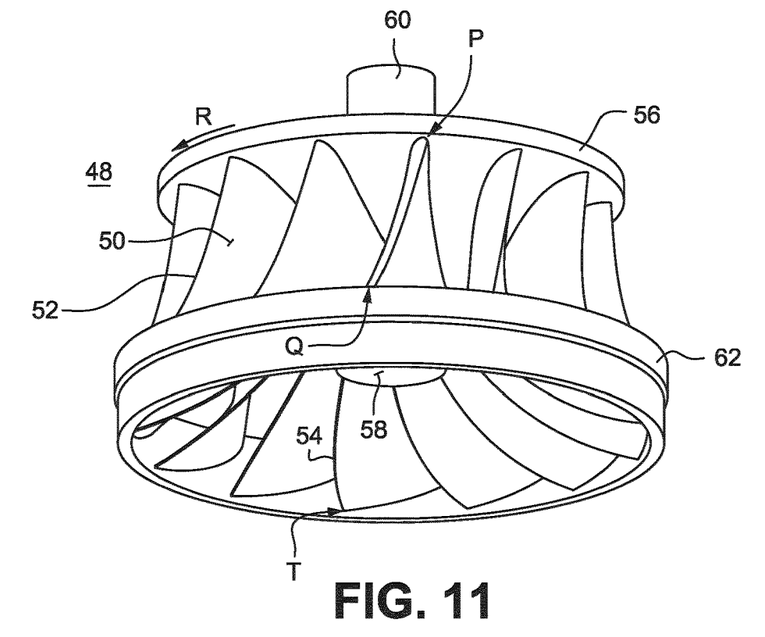
FIG. 11 is a perspective view of the side and bottom of another embodiment of a short runner.
Figure 12:
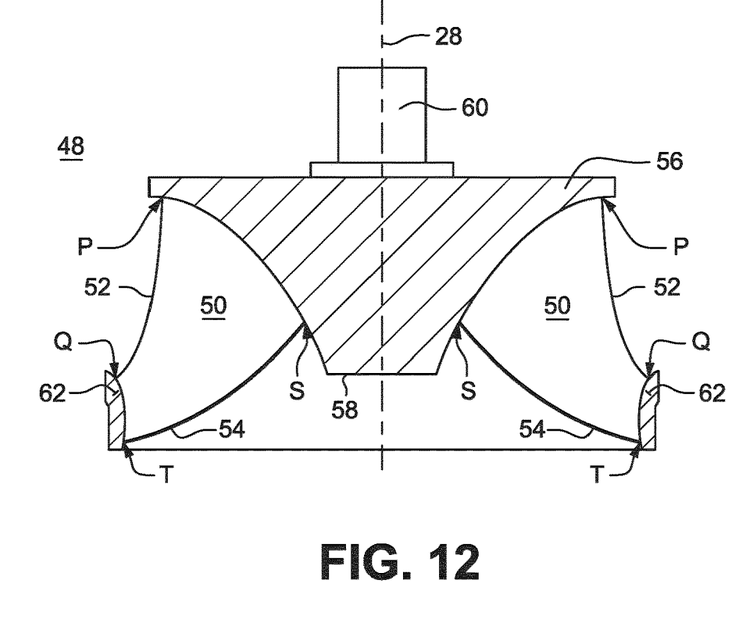
FIG. 12 is a cross-sectional view of the short runner shown in FIG. 11.

FIGS. 11 and 12 show another embodiment of a short runner 48. The runner 48 is adapted to receive a shaft 60. The blades 50 each have a forerunning leading edge 52 with corners P and Q. The trailing edge 54 of each blade 50 is shown as having a curvature that curves away from the leading edge 52. The downstream end of the crown 58 is perpendicular to the axis 28 of the runner 48. The band 62 may have an outer cylindrical surface that is stepped to conform to a stationary bottom ring in the Francis turbine.

Figure 13:
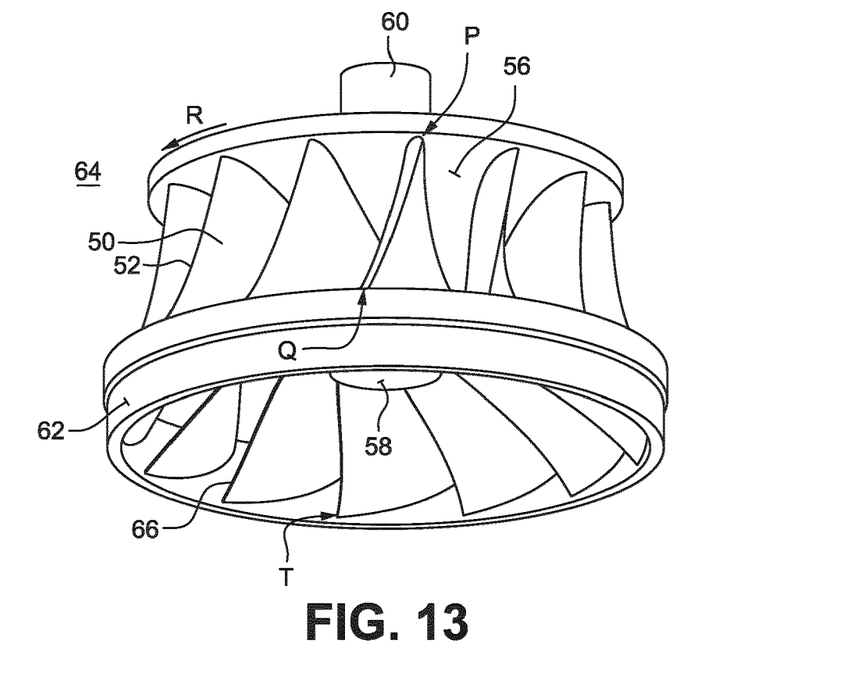
FIG. 13 is a perspective view of the side and bottom of another embodiment of a short runner having an inverted trailing edge.
Figure 14:
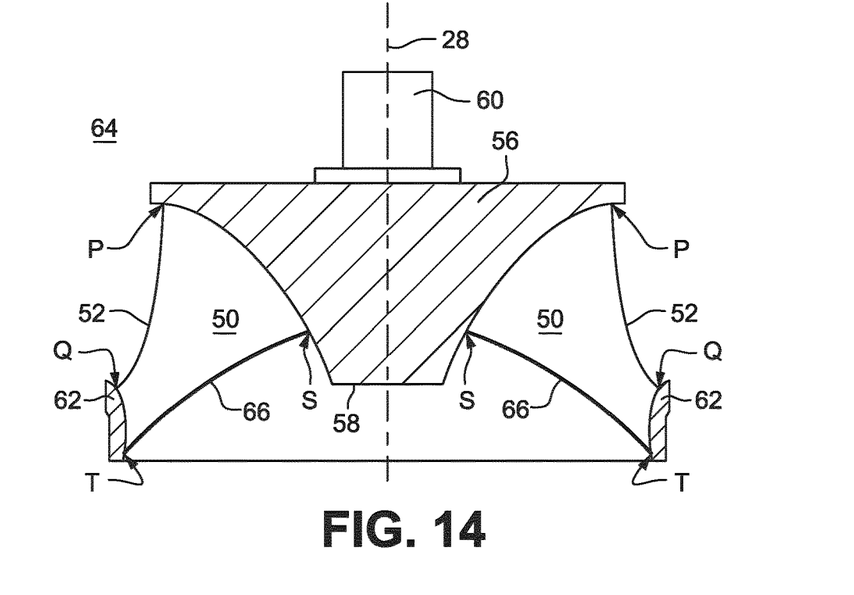
FIG. 14 is a cross-sectional view of the short runner shown in FIG. 13.

FIGS. 13 and 14 show another embodiment of a short runner 64 that is similar to the short runner 48 shown in FIGS. 11 and 12, except for the trailing edge 66. The trailing edge 66 of the short runner 64 is inverted as is evident from the curved edge between the edges T and S of the trailing edge 66 that curves towards the leading edge 52.

Figure 15:
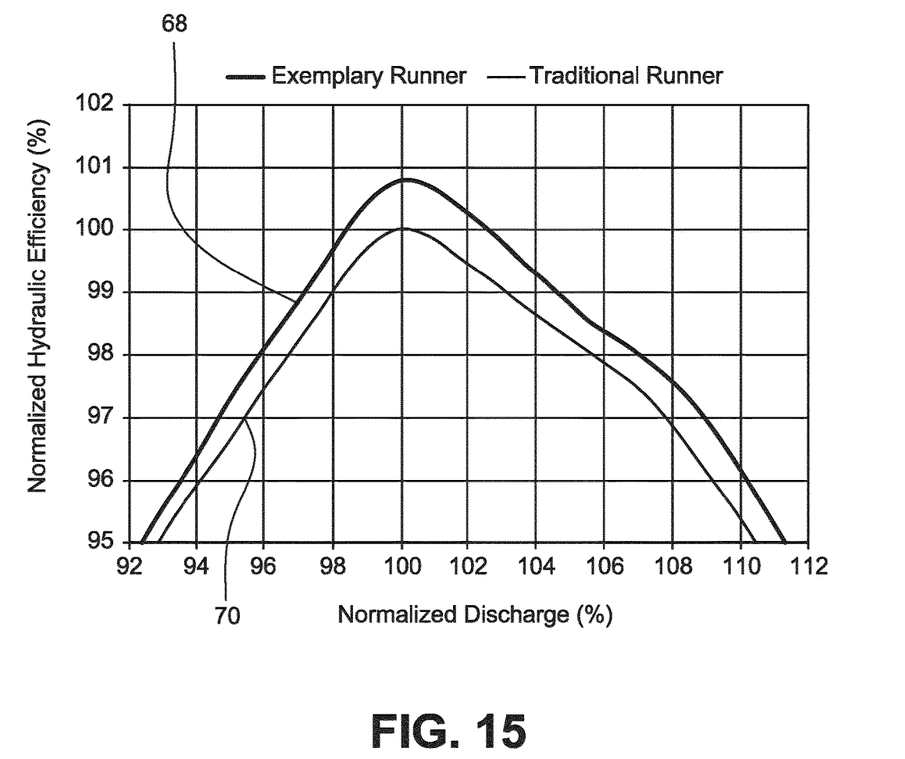
FIG. 15 is a graph comparing the hydraulic efficiencies of a short runner and a conventional long runner.

FIG. 15 is a graphical comparison of the hydraulic efficiency of a conventional long runner to that of a short runner such as runners 26, 48 and 64. The efficiency on the y-axis is normalized with the peak efficiency of the conventional long runner. The discharge on the x-axis is normalized with the discharge at peak efficiency. The performance efficiency 68 of the short runner is consistently higher than the performance efficiency 70 of a conventional long runner. The efficiency is defined as the ratio of energy which is converted to torque on the shaft, to the energy entering the hydraulic system at the inlet of the spiral casing minus the energy leaving the hydraulic system at the outlet of the draft tube.

The short runner may also be used in a horizontal turbine. A short runner for a horizontal turbine would instead have a horizontal axis as the axis of a runner. A short runner may perform such that the advantages of a short runner in a vertical turbine are also seen in a horizontal turbine.

In addition, bandless (shroudless) runners may have a short blade and a forerunning leading edge. Bandless runners may be used in Francis and Kaplan turbines. The forerunning leading edge of a bandless runner can be defined as having a leading edge at the outer periphery of the runner that is in advance of where the leading edge joins the crown in the rotational direction of the bandless runner.

A short bandless runner has a periphery length ratio of the runner that is less than 17% (0.17). The periphery length ratio (L/D) is a ratio between a length (L) that is a distance measured between a lower distributor of the runner to a point of the trailing edge at the outer periphery of the runner, and diameter (D) that is an outlet diameter of the bandless runner, which is a diameter of the runner at an outer periphery of the runner.

The outer peripheral edges of the short blades on the bandless runner may be adapted to face a surface of a bottom ring of a stationary casing, and the blades may be adapted to not allow water to flow between the peripheral edge of the blade and the surface of the stationary casing. For example, the outer peripheral edges of the short blades may form a seal against a stationary surface. The short bandless runner has similar advantages as the short runner with a band.

Advantages of a short runner in a turbine may include, and are not limited to, providing a lighter weight runner, reducing hydraulic friction, increasing hydraulic efficiency and maintaining acceptable cavitation behavior.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A hydraulic turbine runner comprising:
    a band having a band length ratio of no greater than 17% (0.17);
    a crown;
    runner blades extending from the crown to the band; and
    a junction between a leading edge of a runner blade of the runner blades and the band which foreruns a junction between the leading edge with the crown in the rotational direction.

2. The hydraulic turbine runner in claim 1, further comprising a trailing edge of the runner blade having a curvature between the band and crown curving towards the leading edge of the runner blade.

3. The hydraulic turbine runner in claim 1, wherein the band length ratio is the ratio of the length of the band along a direction parallel to an axis of rotation of the runner and a diameter of the band at a junction with a trailing edge.

4. The hydraulic turbine runner in claim 1, wherein the leading edge has a negative rake angle.

5. The hydraulic turbine runner in claim 1, wherein the band length ratio is less than 15% (0.15).

6. A turbine runner comprising:
    an outer periphery of the runner having a periphery length ratio of no greater than 17% (0.17);
    a crown;
    runner blades extending from the crown to the outer periphery of the runner; and
    a corner of the leading edge of each of the runner blades at the outer periphery of the runner, wherein the corner is in advance in the rotational direction of a corner where the leading edge joins the crown.

7. The turbine runner in claim 6, further comprising a trailing edge of the runner blade having a curvature between the outer periphery of the runner and crown curving towards the leading edge of the runner blade.

8. The turbine runner in claim 6, wherein the periphery length ratio is the ratio of a height of an edge of the runner blade at the outer periphery along a direction parallel to an axis of rotation of the runner and a diameter of the outer periphery of the runner.

9. The turbine runner in claim 6, wherein the leading edge has a negative rake angle.

10. The turbine runner in claim 6, wherein the periphery length ratio is less than 15% (0.15).

11. The turbine runner in claim 6 further comprising an annular band attached to an outermost peripheral edge of the blades.

12. A hydraulic turbine comprising:
    a runner including a band having a band length ratio of no greater than 17% (0.17), a crown, runner blades extending from the crown to the band, and a junction between a leading edge of a runner blade of the runner blades and the band which foreruns a junction between the leading edge with the crown in the rotational direction of the runner;
    a spiral casing located upstream of the runner;
    a distributor located between the runner and the spiral casing; and
    a draft tube located downstream from the runner.

13. The hydraulic turbine in claim 12, further comprising a trailing edge of the runner blade of the runner blades having a curvature between the band and crown curving towards the leading edge of the runner blade.

14. The hydraulic turbine in claim 12, wherein the band length ratio is the ratio of the band length measured from the distributor bottom to the attachment point of a trailing edge at the band along a direction parallel to an axis of rotation of the runner, and a diameter of the band at a junction with the trailing edge.

15. The hydraulic turbine in claim 12, wherein the leading edge has a negative rake angle.

16. The hydraulic turbine in claim 12, wherein the band length ratio is less than 15% (0.15).

* * * * *